(12) United States Patent
Czerner

(10) Patent No.: US 9,527,170 B2
(45) Date of Patent: Dec. 27, 2016

(54) METHOD AND APPARATUS FOR REPAIRING GAS TURBINE COMPONENTS MADE OF CERAMIC COMPOSITE MATERIALS

(75) Inventor: Stefan Czerner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 568 days.

(21) Appl. No.: 13/811,597

(22) PCT Filed: Jul. 14, 2011

(86) PCT No.: PCT/EP2011/003515
§ 371 (c)(1),
(2), (4) Date: Feb. 12, 2013

(87) PCT Pub. No.: WO2012/019684
PCT Pub. Date: Feb. 16, 2012

(65) Prior Publication Data
US 2013/0205554 A1    Aug. 15, 2013

(30) Foreign Application Priority Data

Jul. 20, 2010    (DE) ........................ 10 2010 031 795

(51) Int. Cl.
*B23P 6/00*        (2006.01)
*B23K 26/34*        (2014.01)
(Continued)

(52) U.S. Cl.
CPC ................ *B23P 6/002* (2013.01); *B23K 26/32* (2013.01); *B23K 26/34* (2013.01);
(Continued)

(58) Field of Classification Search
CPC ...... B23P 6/002; B23P 6/007; B23K 26/0045; B23K 26/3206; B23K 26/3273; B23K 26/328; B23K 26/34; B23K 2201/001; Y10T 29/49318; Y10T 29/37; F01D 5/005; F01D 5/284
See application file for complete search history.

(56) References Cited

U.S. PATENT DOCUMENTS 4,814,575 A    3/1989  Petitbon
4,878,953 A *  11/1989 Saltzman ................. B23K 9/04
                                                      148/512

(Continued)

FOREIGN PATENT DOCUMENTS

DE    33 25 251    1/1985
DE    40 32 861    4/1992
(Continued)

*Primary Examiner* — Ryan J Walters
(74) *Attorney, Agent, or Firm* — Saliwanchik, Lloyd & Eisenschenk

(57) ABSTRACT

Method for repairing a gas turbine component, which at least at the spot to be repaired consists of a ceramic composite material, where an energy beam locally heats the gas turbine component in a zone, and where one or more auxiliary materials and optionally fibers and/or particles are fed to this zone, wherein a ceramic is generated in the melting zone through the one or more auxiliary materials, and, optionally, the one or more auxiliary materials together with the fibers and/or particles forms a ceramic composite material.

23 Claims, 2 Drawing Sheets

Figure 4:
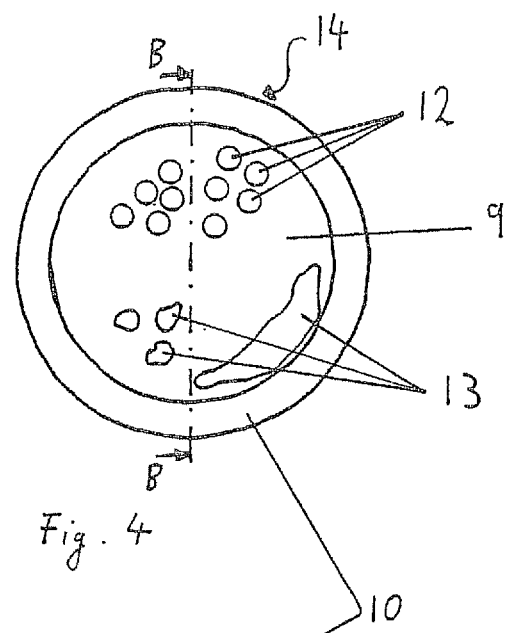

(51) Int. Cl.
  *F01D 5/00* (2006.01)
  *B23K 35/36* (2006.01)
  *B23K 35/02* (2006.01)
  *B23K 26/32* (2014.01)
  *F01D 5/28* (2006.01)

(52) U.S. Cl.
  CPC ...... *B23K 35/0261* (2013.01); *B23K 35/3601* (2013.01); *B23P 6/007* (2013.01); *F01D 5/005* (2013.01); *F01D 5/284* (2013.01); *B23K 2201/001* (2013.01); *B23K 2203/16* (2013.01); *B23K 2203/50* (2015.10); *B23K 2203/52* (2015.10); *F01D 5/282* (2013.01); *Y10T 29/37* (2015.01); *Y10T 29/49318* (2015.01)

(56) References Cited

U.S. PATENT DOCUMENTS

| | | | |
|---|---|---|---|
| 5,371,337 A * | 12/1994 | Campbell et al. | 219/121.63 |
| 5,576,069 A | 11/1996 | Chen et al. | |
| 6,238,743 B1 | 5/2001 | Brooks | |
| 6,617,013 B2 | 9/2003 | Morrison et al. | |
| 6,820,334 B2 | 11/2004 | Kebbede et al. | |
| 7,094,444 B2 * | 8/2006 | Rigney et al. | 427/142 |
| 7,500,833 B2 | 3/2009 | Bublath et al. | |
| 7,938,168 B2 * | 5/2011 | Lee et al. | 164/516 |
| 8,324,526 B2 * | 12/2012 | Gruger et al. | 219/121.63 |
| 2002/0168505 A1 | 11/2002 | Morrison et al. | |
| 2010/0116793 A1 * | 5/2010 | Gruger et al. | 219/121.14 |
| 2010/0151145 A1 | 6/2010 | Richter et al. | |

FOREIGN PATENT DOCUMENTS

| | | |
|---|---|---|
| DE | 10 2006 058 949 | 6/2008 |
| DE | 10 2007 012 845 | 9/2008 |
| DE | 10 2009 017 776 | 10/2010 |
| EP | 0 622 476 | 11/1994 |
| EP | 1 533 396 | 5/2005 |
| EP | 1 559 499 | 8/2005 |
| EP | 1 930 098 | 6/2008 |
| EP | 1 708 846 | 4/2011 |

* cited by examiner

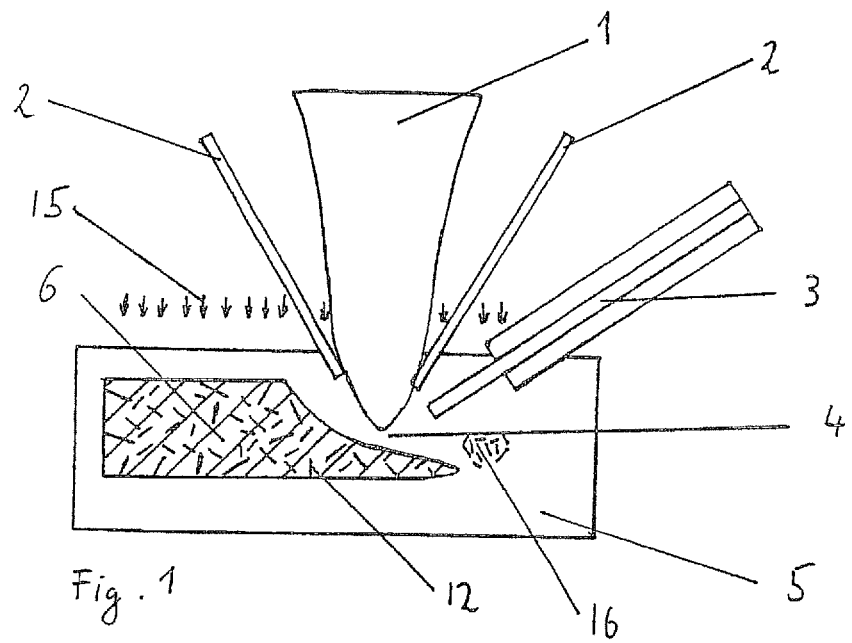
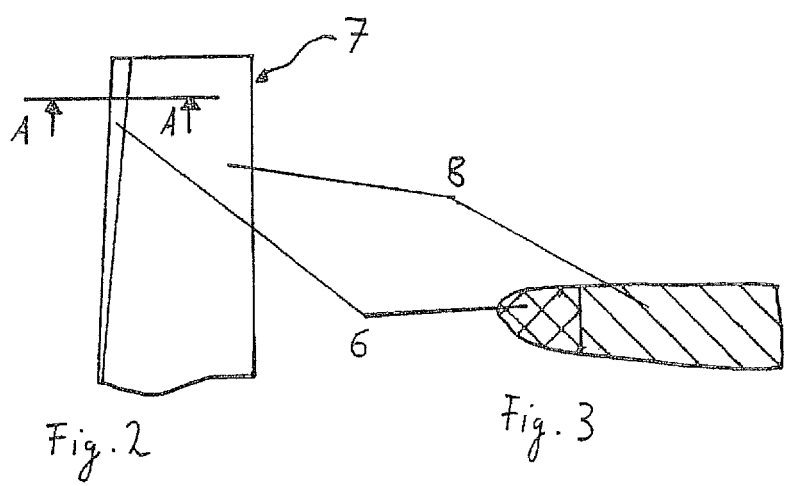

METHOD AND APPARATUS FOR REPAIRING GAS TURBINE COMPONENTS MADE OF CERAMIC COMPOSITE MATERIALS

CROSS-REFERENCE TO RELATED APPLICATIONS

This application is the U.S. national stage application of International Patent Application No. PCT/EP2011/003515, filed Jul. 14, 2011, which claims the benefit of German Patent Application No. 10 2010 031 795.0, filed Jul. 20, 2010, the disclosures of which are incorporated by reference herein in their entirety, including any figures, tables, or drawings.

The present invention relates to a method for repairing gas turbine components made of ceramic composite material where at least at the spot to be repaired consists of a ceramic composite material, and a device for carrying out a method for repairing gas turbine components made of ceramic composite material where at least at the spot to be repaired consists of a ceramic composite material.

There will be an increased use of ceramic components in gas turbines in the future. Due to higher gas temperatures or component temperatures, higher efficiencies of the engines can be achieved with these components. However, it is a general problem of ceramic components that they have a lower ductility than comparable metal components. This goes hand in hand with low fracture toughness, and thus a high risk of fracture. To prevent this problem, ceramics can be reinforced, for example by fibers or particles. Such ceramic composite materials, in particular fibrous composite materials, also called CMC or fiber ceramics, provide a number of advantages. Compared to conventional technical ceramics they have a significantly higher fracture strain, a higher crack resistance and a very high thermal shock resistance. Alternatively, also a composite of ceramics and particles, in addition to fibers, can be used to increase for example the abrasion strength, thermal shock resistance or fracture strength. They generally are well-suited for various applications in aeronautics due to their high temperature stability and their low density. Combinations of fibrous materials/particle materials/matrix materials made of the following materials and combinations thereof can be given as examples for common ceramic fibrous composite materials and particle composite materials: silicon carbide/silicon, silicon carbide/silicon nitride, silicon carbide/carbon, carbon/carbon, aluminum oxide/aluminum.

The repair of components or component sections made of ceramic composite materials raises a problem, as hitherto existing repair methods require many process steps and time-consuming furnace treatments of the components to be repaired.

A repair method for ceramic fibrous composite materials is presented in U.S. Pat. No. 6,820,334 B2. To repair the components, cut-to-size tapes of ceramic fibrous composite materials are positioned next to a pre-processed spot to be repaired, the component as a whole subsequently is autoclaved in a vacuum bag and is then subjected to a first heat treatment at approximately 750° C. and a second heat treatment at approximately 1425° C. in a vacuum furnace.

Another solution is known from EP 1 559 499 A1. Here, the component made of a ceramic fibrous composite material first is processed mechanically to form a depression or to wear out the matrix of the composite material, to then repair the component by locally reconstructing the ceramic matrix plus sintering and/or new infiltration using CVD (Chemical Vapor Deposition) methods at 700° C. up to 1100° C.

What both methods have in common is that a component section needs to be processed with a plurality of process steps. Material partly needs to be pre-deposited, which is time-consuming, besides there are several basic problems with processing fibers and aggregates in a furnace, a mold or by the use of a pre-deposited tape: the first problem is that for bigger components accordingly big furnaces need to be available to make repair possible in the first place. In the case of small components, the furnace size is a problem insofar as there often is a large number of small components, and accordingly many furnace cycles generally also need to be completed for repairing the large number of small components, while it is barely possible to meet the individual requirements (for example temperatures, pressures, etc.) of all components. The second problem is that due to the long-time acting heat of the molten mass or furnace there is a risk of decomposition of fibers and/or damage of the component to be repaired and/or damage of the spot to be repaired. A high stress caused by the thermal influence and the applied materials further needs to be compensated when treating large surfaces. Furthermore, the use of methods requiring a casting mold is limited, in particular in the case of free formed surfaces of the gas turbine section, like for example airfoils, as individual damaging mechanisms and individual deformations due to manufacture and operation imply an enormous number of different pre-molds. Since gas turbine components are subjected to a plurality of actions by corrosive substances, oxidizing atmospheres, high temperatures or even foreign objects, damages to the components are practically unavoidable, justifying the demand for cost-effective repair methods in particular in view of the high costs of the new parts.

It therefore is the object of the invention to provide a low-cost method for repairing generic gas turbine components and a corresponding device for carrying out said method.

The invention solves the object with a method for repairing a as turbine component, which at least at the spot to be repaired consists of a ceramic composite material, where an energy beam locally heats the gas turbine component in a zone, and one or more auxiliary materials and optional fibers and/or particles are fed to this zone, where a ceramic is generated in the melting zone through this auxiliary method or these auxiliary materials, which together with the fed fibers and/or particles forms a ceramic composite material and a device for repairing a gas turbine component, which at least at the spot to he repaired consists of a ceramic composite material, where an energy beam locally heats the gas turbine component in a zone, and one or more auxiliary materials and optional fibers and/or particles are fed to this zone, where a ceramic is generated in the melting zone through this auxiliary method or these auxiliary materials, which together with the fed fibers and/or particles forms a ceramic composite material, where a flux cored wire is provided for feeding the auxiliary materials and/or the fibers. Further preferred embodiments of the invention can be learned from the related descriptions and drawings.

For the solution of the object, the invention proposes a method for repairing a gas turbine component, the gas turbine component at least at the spot to be repaired consisting of a ceramic composite material, and during which the gas turbine component is locally heated in a zone by an energy beam, and one or more auxiliary materials and optionally fibers and/or particles are fed to this zone, with a ceramic being generated in the melting zone through this auxiliary material or these auxiliary materials, which together with the fed fibers and/or particles forms a ceramic fibrous composite material. The inventive process of bonding the generated ceramic to the ceramic present in the component essentially is possible in two ways, in each of which the component is thermally activated. The first way includes incipiently melting the present ceramic and bonding it to the fed materials. Due to possibly occurring shrinkages, this way is suited for certain components only. The second way is carried out by way of a heating-coating-reaction. Bonding the present material to fed material at the boundary surface includes three steps. In the first step, a zone of the component is heated by an energy beam or by the molten mass of the fed materials. In the second step, the present ceramic boundary surface is coated by the fed materials, for example by fusible silicon or aluminum. In the third step, the molten metals partially or completely react to metal-non-metal-compounds (ceramic).

The inventive method for repairing the gas turbine component enables the local generation of a ceramic composite material, without the need for time-consuming furnace treatments. If specifically required, the component can be subjected to a furnace treatment, for example a stress-relief annealing, but normally this is not necessary, as due to the very high temperatures during operation low stresses in the components repaired according to the invention are quickly relieved anyway. A special advantage of the developed method is that shrinkage stresses, which are practically unavoidable when using standard methods (for example sintering) for generating ceramic composite materials, can be reduced. The inventive method generally is easy to carry out, as only the damaged area is actually repaired, and not the component as a whole needs to be subjected to a sintering process or casting process. The component also does not have to be newly infiltrated, as the ceramic composite material can directly be generated locally by inventively feeding the fibers to the melting zone, where the ceramic is formed.

Preferably, the fed auxiliary material or the fed auxiliary materials completely or partially react to a ceramic in a chemical reaction in the melting zone. The components required therefor, for example a metal like silicon and a non-metal like carbon, are fed to the melting zone as auxiliary materials in a stoichiometric ratio and then react to the desired ceramic, in this case silicon carbide. A metal proportion which is 20 to 40% higher than it would be required for stoichiometric reasons is preferably provided to have all of the non-metal react completely. The reason for this is the aim that the carbon reacts completely and does not remain elementally in the fusion zone due to local lack of silicon. A leftover of silicon is approvingly accepted, as this may even have positive effects on the material properties, as many finely dispersed silicon inclusions in the matrix of the ceramic can have a positive effect on the ductility and fracture toughness of the fusion zone. While the auxiliary materials react, they ideally equally enclose the non-melted fibers and/or particles of the base material exposed in the molten mass and the additionally fed fibers and/or particles, so that after the chemical reaction the new material is firmly bonded to the base material. It is a specific advantage that not only a compound between two matrix materials is obtained, but that old and new fibers and/or particles extend into the molten bath reacting to ceramic, by which a compound of particularly high quality is generated according to the invention. A matrix generally characterizes a continuous material or phase containing non-continuous other phases and/or particles and/or fibers of the same or another material.

The fed auxiliary material or the fed auxiliary materials preferably can already contain the ceramic to be generated. The auxiliary material or the auxiliary materials fed to the melting zone are completely or partially heated beyond the melting point by the energy beam. The molten bath generated thereby due to its liquid nature is able to flow around the fibers and/or particles of the base material and the newly fed fibers and/or particles and, after becoming solid, to bond the base material to the additionally fed materials. Preferably, the fed auxiliary material and the additionally fed fibers and/or particles consist of the same material combination as the base material, i.e. the auxiliary material or the auxiliary materials and/or the fibers and/or the particles are chosen in such a way that they generate the same ceramic composite material, of which the gas turbine component also mainly consists. Due to the similar compound partners, the resulting compound is particularly easy to realize (identical properties like for example the melting point facilitate the process), and the compound further is of particularly high quality. For example, identical coefficients of thermal expansion are very advantageous in order to minimize thermal stresses of the compound, being of overriding importance for applications in the turbine section.

The fed auxiliary material or the fed auxiliary materials and/or the fibers and/or the particles are preferably pre-deposited and/or are fed to the reaction energy via one or more feeders. In some cases, pre-depositing the auxiliary materials and/or the fibers and/or the particles at the spot to be repaired can provide advantages, but normally the auxiliary materials and/or the fibers and/or the particles are preferably fed via a feeder which is coaxial or lateral to the energy beam. This provides the advantage that all layers can be processed, and with a controlled feeding the auxiliary materials and/or fibers and/or particles can be fed to the fusion zone in a defined manner. This can be carried out in a particularly defined and controlled manner, if a flux cored wire is provided for feeding the auxiliary materials and/or the fibers and/or the particles. This flux cored wire contains the required materials in a suitable amount and composition. A flux cored wire provides the advantage that it is possible to feed all required components via one single feeder. Depending on the needs, the flux cored wire for example contains silicon and carbon as well as silicon carbide fibers and is used to repair a component made of a ceramic silicon carbide composite material. Even very small fibers, which due to their pulmonary intrusion usually can only be fed involving difficulties and effort, can be fed easily, but also continuous fibers can be fed without any difficulties, as the length of the flux cored wire is not limited. Such a defined feeding of fibers of any length and diameter for repairing ceramic fibrous composite materials by the use of reacting filler materials provides miscellaneous repair options. Thus, it is also possible to close cracks in gas turbine components made of ceramic fibrous composite materials with the inventive method and to reinforce such a weak spot for example by several layers on top of each other. It is also possible to join two components together for example by arranging the melting zone and thus the fusion zone right in the area, where the components contact each other.

The design of the flux cored wire is preferably chosen in such a way that the flux cored wire comprises an outer sheath, the material of the outer sheath itself possibly containing one or more auxiliary materials, and the outer sheath encloses an interior, auxiliary materials and/or fibers and/or particles being provided in the interior. Such a flux cored wire provides the advantage that the outer sheath does not only serve as a structural element, but at the same time can assume the role of the auxiliary materials. Thereby, material is saved and no impurities, which would have occurred by the use of a flux cored wire without filler material outer sheath, are leftover in the component. The interior of the flux cored wire is filled with the various auxiliary materials and fibers, the auxiliary materials for example being present in the form of sheet metal, powder, paste or fibers. The amount and kind of the filler materials is adjusted to the respective need and it is ensured that a constant amount of filler materials and/or fibers and/or particles is continuously fed to the melting zone, which for example cannot always be guaranteed by pre-deposition, as in this case the components locally are not always available in the desired ratio. Pre-deposited material is fed to the molten bath by guiding the molten bath generated by the energy beam, together with the energy beam, across the gas turbine component, along a pre-defined path, and melting material pre-deposited on this path via the energy beam and thereby feeding the pre-deposited material to the molten bath. When using such a pre-deposition it may happen that fibers and/or particles are not evenly dispersed in the pre-deposited fiber/powder mixture, but accumulate in an area (for example due to differences in density or agglomeration effects), and that the ceramic composite material formed from such a mixture then accordingly does not overall have the desired material properties, i.e. it could have weak spots.

A gas stream is preferably provided in the interior of the flux cored wire, which is preferably used to provide a protective gas and/or reactant gas for the repair method. Depending on the material of the component and the ceramic to be generated, it can be necessary or helpful to provide a protective gas or a reactant gas. For example, argon as a protective gas could shield the fusion zone from atmospheric oxygen or, in another case, could be used together with methane for depositing carbon.

The energy beam is preferably realized as a laser beam. The advantage of a laser beam is that the process does not have to be carried out in a vacuum and the melting zone due to the slight scattering of the laser beam can be formed in a highly defined manner. The energy beam preferably can also be realized as an electron beam, which can be advantageous for certain applications. Furthermore, the energy beam preferably can also be realized as an induction field. In this case the energy beam is induced in the component by the induction field, which is suitable in particular for ceramic composite materials containing conductive fibers or particles.

In the following, the invention is described in more detail on the basis of specific embodiments with the aid of figures. The figures show in detail:

FIG. 1: a schematic illustration of the inventive device.

FIG. 2: representation of an inventive repair of a gas turbine component made of ceramic fibrous composite material.

FIG. 3: cut AA of the gas turbine component from FIG. 2.

FIG. 4: schematic design of the inventive flux cored wire design.

Figure 5:
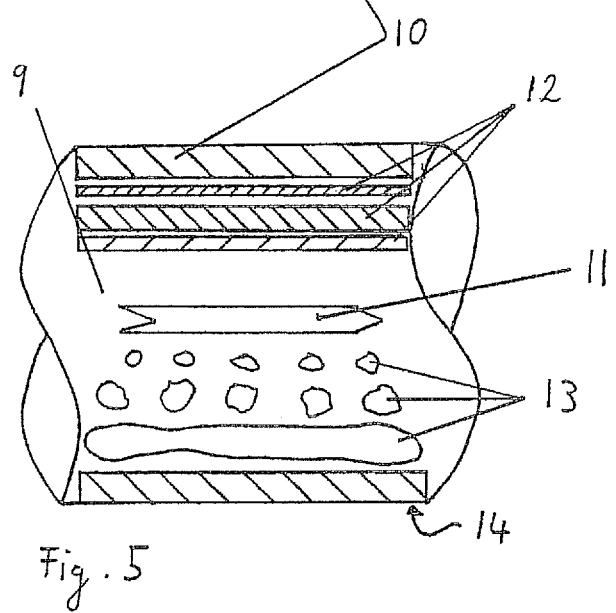

FIG. 5: cut BB of the flux cored wire from FIG. 4.

FIG. 1 shows the inventive device for carrying out the method. An energy beam 1 can be seen, which is directed onto a base material surface 5 which is to be processed. Thereby, the base material is thermally activated locally in a zone, which here is realized as a melting zone 4, i.e. it is heated and/or melted, so that a coating by molten masses or molten products can be effected. Material is fed to this melting zone 4 via a lateral feeder 3 and/or via a symmetric or coaxial feeder 2. Optionally, this material can also be fed to the melting zone 4 in addition or exclusively via a pre-deposition 16. A process gas 15 (for example oxygen, methane, argon) can also be fed to the melting zone 4, optionally also the present surrounding atmosphere (for example atmospheric oxygen and/or atmospheric nitrogen) can be used to benefit the process (for example for oxide/nitride formation). The aim is to provide a ceramic fibrous composite material 6 by feeding material, optionally in combination with feeding gas, to repair for example the gas turbine component 7 illustrated in FIG. 2.

The gas turbine component 7 illustrated in FIG. 2 can be for example a single blade with blade root or also a blade on an integral component (blisk or vane cluster). As a result of operation, the gas turbine component 7 is torn and damaged on the stream inlet side, so that using the inventive repair method a ceramic fibrous composite material 6 has been applied onto the base body 8 of the gas turbine component 7 for reinforcement, to restore the initial blade geometry. For the purpose of clarification, FIG. 3 shows a cut AA through the gas turbine component 7.

FIG. 3 particularly clearly shows how the present base body 8 adjoins the newly applied ceramic fibrous composite material 6. With the inventive method it is possible to repair torn gas turbine components made of ceramic fibrous composite materials. The major advantage of the inventive method is that it is comparatively easy and low-priced, as only the damaged area is actually repaired and the gas turbine component 7 as a whole does not have to be subjected to a sintering process or casting process. The gas turbine component 7 also does not have to be newly infiltrated. Instead, it is possible to locally re-build the ceramic in the original composition and condition or in alternative qualities by inventively feeding the fibers 12 to the melting zone 4, so that the ceramic fibrous composite material 6 can directly be generated locally. Thereby, in certain cases a repair can also be carried out "on-wing", i.e. without the need for removing gas turbine components 7 from the gas turbine. Owing to this extremely reduced process effort, the described method is much more cost-effective than well-known repair methods of ceramic fibrous composite materials.

FIG. 4 shows the design of the inventive flux cored wire 14. The marked cut BB is shown in FIG. 5. The flux cored wire 14 contains fibers 12 and auxiliary materials 13 which can be available in different shapes, sizes and amounts. Particles are not shown, but according to the invention they can also be contained in the flux cored wire, preferably if a particle-reinforced ceramic composite material is repaired. The fibers 12 can have a length of for example a few micrometers, or alternatively they can have any length (so-called continuous fibers). The auxiliary materials 13 can be available in the form of small metal sheets, as powder or pastes. The interior 9, in which most of the fibers 12 and auxiliary materials 13 are provided, is enclosed by an outer sheath 10 which itself can also be an auxiliary material 13. In addition, a gas stream 11 can also be provided in the interior 9, via which protective gases and/or process gases 15 can be carried to the spot to be repaired via the flux cored wire 14.

By feeding the auxiliary materials 13 to the melting zone 4 generated by the energy beam 1, a ceramic is generated in the melting zone, which together with additionally fed fibers 12 forms a ceramic fibrous composite material 6. The components required therefor, for example a metal like silicon and a non-metal like carbon, are fed to the melting zone 4 as auxiliary materials 13 in a stoichiometric ratio and then react to the desired ceramic, in this case silicon carbide. A silicon proportion optionally increased by 20 to 40% ensures a complete reaction of the carbon, which cannot always be achieved with an absolutely stoichiometric ratio, as in this case it cannot be assumed that for the total amount of carbon also silicon is available nearby for reaction. The leftover silicon ideally remains in finely dispersed silicon inclusions and thereby can further help improve the ductility of the generated ceramic fibrous composite material 6.

The inventive flux cored wire 14 provides a number of options for repairing gas turbine components. Depending on the needs, the flux cored wire 14 can have an individual design to thus comply with the different requirements of the different fiber combinations and matrix combinations. This option for individual composition, for choosing the amount of the auxiliary materials 13, of the fibers and also of the protective gas and process gas 15 allows for the easy application and adaption of the inventive method and the inventive device to existing and future gas turbine components made of ceramic fibrous composite materials.

REFERENCE NUMERALS

1 energy beam
2 coaxial feeder
3 lateral feeder
4 melting zone
5 base material surface
6 ceramic fibrous composite material
7 gas turbine component
8 base body
9 interior
10 outer sheath
11 gas stream
12 fibers
13 auxiliary materials
14 flux cored wire
15 process gas
16 pre-deposition

The invention claimed is:

1. A method for repairing a gas turbine component, comprising:
heating a portion of a gas turbine component via an energy beam in a melting zone,
wherein the energy beam is directed onto a surface of the portion of the gas turbine component,
wherein a base material of the gas turbine component, at least at a spot to be repaired, comprises:
a first ceramic composite material,
wherein the spot to be repaired is in the melting zone;
feeding one or more auxiliary materials to the melting zone,
wherein a ceramic is generated, at least at the spot to be repaired, in the melting zone from the one or more auxiliary materials,
wherein the one or more auxiliary materials completely or partially react to generate the ceramic in a chemical reaction in the melting zone; and
feeding fibers and/or particles to the melting zone,
wherein a second ceramic composite material is generated in the melting zone from the one or more auxiliary materials and the fibers and/or particles,
wherein the second ceramic composite material is in contact with the base material of the gas turbine component, at least at the spot to be repaired.

2. The method according to claim 1,
wherein the one or more auxiliary materials comprise a metal and a non-metal, and
wherein the metal and the non-metal react in the chemical reaction to generate the ceramic.

3. The method according to claim 2,
wherein a proportion of the metal is higher than a proportion of the non-metal.

4. The method according to claim 3,
wherein the proportion of the metal is 20% to 40% higher than the proportion of the non-metal.

5. The method according to claim 1,
wherein the first ceramic composite material comprises a first ceramic, and
wherein the first ceramic is the same as the ceramic.

6. The method according to claim 1,
wherein the second ceramic composite material is the same as the first ceramic composite material.

7. The method according to claim 1,
wherein feeding the one or more auxiliary materials to the melting zone comprises pre-depositing the one or more auxiliary materials to the melting zone.

8. The method according to claim 1,
wherein feeding the fibers and/or the particles to the melting zone comprises pre-depositing the fibers and/or the particles to the melting zone.

9. The method according to claim 1,
wherein feeding the one or more auxiliary materials to the melting zone comprises feeding the one or more auxiliary materials to the melting zone via one or more feeders.

10. The method according to claim 1,
wherein feeding the fiber and/or the particles to the melting zone comprises feeding the fiber and/or the particles to the melting zone via one or more feeders.

11. The method according to claim 1,
wherein the energy beam is a laser beam.

12. The method according to claim 1,
wherein the energy beam is an electron beam.

13. The method according to claim 1,
wherein the energy beam is an induction field.

14. The method according to claim 1,
wherein feeding the one or more auxiliary materials to the melting zone comprises feeding the one or more auxiliary materials to the melting zone via a flux cored wire.

15. The method according to claim 1,
wherein feeding the one or more auxiliary materials and the fibers and/or the particles to the melting zone comprises feeding the one or more auxiliary materials and the fibers and/or the particles to the melting zone via a flux cored wire.

16. The method according to claim 15,
wherein the flux cored wire comprises an outer sheath, wherein the outer sheath encloses an interior.

17. The method according to claim 16,
wherein a material of the outer sheath comprises at least a first portion of the one or more auxiliary materials.

18. The method according to claim 17,
wherein at least a second portion of the one or more auxiliary materials is located in the interior.

19. The method according to claim 16,
wherein at least a portion of the fibers and/or the particles is located in the interior.

20. The method according to claim 16,
wherein a gas stream is provided in the interior.

21. The method according to claim 1,
wherein the base material of the gas turbine component, at least at the spot to be repaired, is the first ceramic composite material.

22. The method according to claim 1,
wherein the second ceramic composite material adjoins to the base material of the gas turbine component, at least at the spot to be repaired.

23. The method according to claim 1, wherein the one or more auxiliary materials comprise a material that is the same as the ceramic.

\* \* \* \* \*